(12) United States Patent
Cho et al.

(10) Patent No.: US 10,815,338 B2
(45) Date of Patent: Oct. 27, 2020

(54) POLYIMIDE FILM AND METHOD FOR PRODUCING SAME

(71) Applicant: SKCKOLON PI INC., Chungcheongbuk-do (KR)

(72) Inventors: Sung-il Cho, Yongin-si (KR); Dong Young Won, Seoul (KR); Sung Won Kim, Suwon-si (KR)

(73) Assignee: PI ADVANCED MATERIALS CO., LTD., Jincheon-gun (KR)

( * ) Notice: Subject to any disclaimer, the term of this patent is extended or adjusted under 35 U.S.C. 154(b) by 24 days.

(21) Appl. No.: 15/766,434

(22) PCT Filed: Oct. 7, 2016

(86) PCT No.: PCT/KR2016/011220
§ 371 (c)(1),
(2) Date: Apr. 6, 2018

(87) PCT Pub. No.: WO2017/073921
PCT Pub. Date: May 4, 2017

(65) Prior Publication Data
US 2018/0312638 A1   Nov. 1, 2018

(30) Foreign Application Priority Data
Oct. 29, 2015   (KR) .................. 10-2015-0150822

(51) Int. Cl.
| | | |
|---|---|---|
| C08G 73/10 | (2006.01) | |
| C08J 5/18 | (2006.01) | |
| C08K 3/013 | (2018.01) | |
| C08L 79/08 | (2006.01) | |
| C08K 3/04 | (2006.01) | |
| C01B 32/205 | (2017.01) | |
| C08K 3/32 | (2006.01) | |

(52) U.S. Cl.
CPC ........ *C08G 73/1071* (2013.01); *C01B 32/205* (2017.08); *C08G 73/105* (2013.01); *C08G 73/1028* (2013.01); *C08J 5/18* (2013.01); *C08K 3/013* (2018.01); *C08K 3/042* (2017.05); *C08K 3/32* (2013.01); *C08L 79/08* (2013.01); *C08J 2379/08* (2013.01); *C08K 2003/325* (2013.01)

(58) Field of Classification Search
None
See application file for complete search history.

(56) References Cited

U.S. PATENT DOCUMENTS

2013/0240777 A1* 9/2013 Yasuda ................ C09K 5/14
252/75

FOREIGN PATENT DOCUMENTS

| CN | 1826288 A | 8/2006 |
|---|---|---|
| CN | 104629051 A | 5/2015 |
| JP | 4864293 B2 | 2/2012 |
| JP | 2013-256732 A | 12/2013 |
| JP | 2014-136721 A | 7/2014 |
| KR | 10-2006-0096413 A | 9/2006 |
| KR | 10-2011-0110345 A | 10/2011 |
| KR | 10-2015-0055525 A | 5/2015 |
| KR | 10-2015-0077177 A | 7/2015 |

OTHER PUBLICATIONS

International Search Report of PCT/KR2016/011220 dated Jan. 16, 2017 [PCT/ISA/210].
Korean Intellectual Property Office, Communication dated Nov. 22, 2019, issued in corresponding Korean Application No. 10-2015-0150822.

* cited by examiner

*Primary Examiner* — Robert T Butcher
(74) *Attorney, Agent, or Firm* — Sughrue Mion, PLLC

(57) ABSTRACT

The present invention relates to a polyimide film and a preparation method thereof. According to the present invention, a polyamic acid solution having a high weight-average molecular weight may be obtained by adjusting viscosity and solid content of the polyamic acid solution, and thus, a desired polyimide film may be prepared therefrom. Furthermore, since a length of carbon chains rearranged during graphitization is increased, a graphite sheet having excellent thermal conductivity can be prepared from the polyimide film of the present invention. Also, since the polyimide film has improved windability by further including inorganic particles as a filler, it may facilitate the wind operation.

3 Claims, 1 Drawing Sheet

POLYIMIDE FILM AND METHOD FOR PRODUCING SAME

TECHNICAL FIELD

The present invention relates to a polyimide film for graphite having excellent thermal conductivity and a preparation method thereof.

BACKGROUND ART

Recently, since electronic devices become more lightweight, more compact, slimmer, and highly integrated a heat generation amount per unit volume of such devices is increased and such thermal load increase causes many problems therein. Thus, heat dissipation in the electronic devices is one of very important issues.

An example of a heat dissipation means used in the electronic devices may be graphite. Graphite has a layered or stacked structure of graphene, a two-dimensional planar sheet where carbon atoms are arranged in a hexagonal shape. Since electrical conductivity, thermal conductivity, mechanical strength, elasticity, and transparency of graphite are excellent, it has been widely used as a material for energy storage such as a secondary battery, a fuel cell and a super capacitor, a filtration membrane, a chemical detector, a transparent electrode, and a heat dissipation material.

Recently, a graphite sheet has been prepared by carbonization and graphitization of a polyimide resin.

Specifically, a polyamic acid derivative is prepared by solution polymerization of an aromatic dianhydride with an aromatic diamine or aromatic diisocyanate, and then a polyimide (PI) resin is prepared by imidization of the polyamic acid derivative via ring-closing dehydration at a high temperature.

As an example of graphitization using the polyimide resin, Japanese Patent No. 4864293 discloses a method for preparing highly-oriented graphite by controlling birefringence by way of stacking a polyimide film and performing a heating and pressurizing treatment. However, it is silent on a heat dissipation effect according to thermal conductivity and thermal efficiency of graphite.

Thus, the inventors devised a novel polyimide film for graphite having excellent thermal conductivity and a preparation method thereof.

DISCLOSURE OF INVENTION

Technical Problem

An object of the present invention is to provide a polyimide film for preparing a graphite sheet having excellent thermal conductivity and a preparation method thereof.

Solution to Problem

To achieve the above object, the present invention provides a polyimide film for graphite including:
(a) preparing a polyamic acid solution by reaction of a diamine monomer with an acid dianhydride monomer in a solvent;
(b) mixing the polyamic acid solution with an imidization solution to prepare a gel film; and
(c) imidizing the gel film by performing a heat treatment, wherein, a solid content ($\beta_1$) of the polyamic acid solution is in a range of 15% to 20% where the solid content ($\beta_1$) of the polyamic acid solution denotes a weight percentage of the monomers based on a total weight of the solvent and the monomers used in the reaction; the polyamic acid solution has a viscosity ($\beta_2$) (23° C.) of 55,000 cps to 900,000 cps; and the solid content ($\beta_1$) and the viscosity ($\beta_2$) of the polyamic acid solution satisfy Equation 1:

$$-0.87 \leq -1.46 \log_{10}(\beta_1) + 0.18 \log_{10}(\beta_2). \qquad \text{[Equation 1]}$$

Advantageous Effects of Invention

According to the method of the present invention for preparing a polyimide film for graphite, a polyamic acid solution having a high weight-average molecular weight may be obtained by adjusting viscosity and a solid content of the polyamic acid solution, and thus, a desired polyimide film may be prepared therefrom. Since a length of carbon chains rearranged during graphitization of this polyimide film is more increased, a converted graphite sheet has excellent thermal conductivity. Furthermore, the polyimide film of the present invention has improved windability by further including inorganic particles as a filler.

BEST MODE FOR CARRYING OUT THE INVENTION

Figure 1:
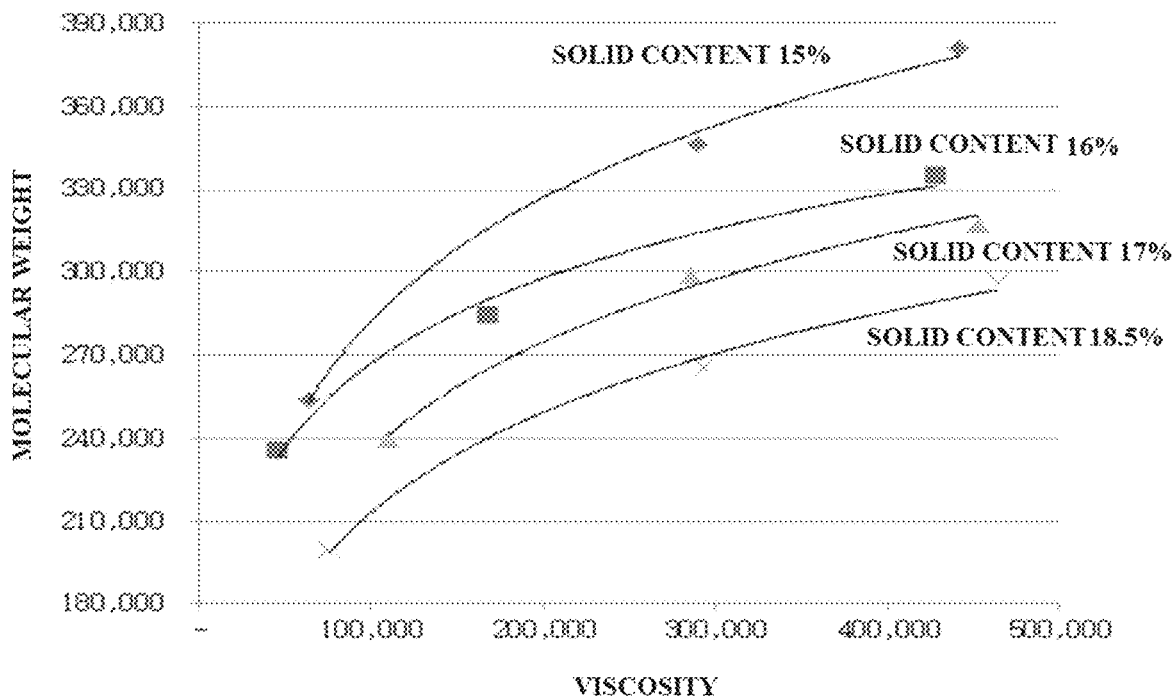
FIG. 1 is a graph illustrating measurement values of weight-average molecular weight and viscosity of a polyamic acid solution used in the preparation of a polyimide film according to an embodiment, for respective solid contents.

Hereinafter, the present invention will be described in more detail.

According to the present invention, there is provided a method of preparing a polyimide film for a graphite sheet which includes (a) preparing a polyamic acid solution by reaction of a diamine monomer with an acid dianhydride monomer in a solvent; (b) mixing the polyamic acid solution with an imidization solution to prepare a gel film; and (c) imidizing the gel film by performing a heat treatment, wherein a solid content ($\beta_1$) of the polyamic acid solution is in a range of 15% to 20% where the solid content ($\beta_1$) of the polyamic acid solution denotes a weight percentage of the monomers based on a total weight of the solvent and the monomers used in the reaction; the polyamic acid solution has a viscosity ($\beta_2$) (23° C.) of 55,000 cps to 900,000 cps; and the solid content ($\beta_1$) and the viscosity ($\beta_2$) of the polyamic acid solution satisfy Equation 1.

$$-0.87 \leq -1.46 \log_{10}(\beta_1) + 0.18 \log_{10}(\beta_2) \qquad \text{[Equation 1]}$$

First, the method of preparing a polyimide film for a graphite sheet according to the present invention includes the preparation of a polyamic acid solution by reaction of a diamine monomer with an acid dianhydride monomer in a solvent.

The diamine monomer and the acid dianhydride monomer may selected from those typically used in the polymerization of polyamic acid.

Specifically, the diamine monomer may include para-phenylenediamine (pPDA), diaminophenyl ether, o-phenylenediamine, m-phenylenediamine, 4,4-diaminodiphenyl ether (ODA), 3,4-diaminodiphenyl ether, or 2,4-diaminodiphenyl ether, particularly, diaminophenyl ether or 4,4-diaminodiphenyl ether, but is not limited thereto.

The acid dianhydride monomer may include biphenyltetracarboxylic acid dianhydride or any derivative thereof, pyromellitic dianhydride (PMDA), 3,3',4,4'-benzophenone tetracarboxylic acid anhydride, or p-phenylene-bis trimellitic dianhydride, particularly, pyromellitic dianhydride, but is not limited thereto.

A polyamic acid solution may be prepared by polymerization of the diamine monomer and the acid dianhydride monomer in a solvent, particularly, an organic solvent. An amide-based organic solvent may be used as the solvent, and more particularly, N,N'-dimethylformamide, N,N'-dimethylacetamide, N-methylpyrrolidone, or a mixture thereof may be used.

The weight-average molecular weight of the polyamic acid solution may be 240,000 or more, particularly 260,000 or more, and more particularly 280,000 or more. When a polyimide film prepared from the polyamic acid solution having these ranges of the weight-average molecular weight is used, a graphite sheet having excellent thermal conductivity may be prepared in comparison with that prepared from the polyamic acid solution having the weight-average molecular weight of less than 240,000.

The range of the weight-average molecular weight may be controlled by adjusting the viscosity of the polyamic acid solution. Specifically, the weight-average molecular weight is increased in proportion to the viscosity. However, the weight-average molecular weight does not have a one-dimensional linear proportional relationship with the viscosity, but is proportional to the viscosity in the form of a logarithmic function (see FIG. 1). That is, even if the viscosity is increased to obtain a polyamic acid solution having the higher weight-average molecular weight, the extent of the increase of the weight-average molecular weight limited. Further, in the case that the viscosity is excessively increased, problems may occur due to the pressure increase in a die during the discharge of varnish through the die in a film preparation process. Thus, it is necessary to control an amount of the diamine monomer and the acid dianhydride monomer, which used as raw materials in the polymerization of the polyamic acid, in addition to the viscosity control in order to obtain the higher weight-average molecular weight of the polyamic acid solution.

The amount of the diamine monomer and the acid dianhydride monomer used in the polymerization of the polyamic acid, i.e., the solid content, together with the viscosity, may affect the weight-average molecular weight of the polyamic acid solution. In the case that the weight-average molecular weight is controlled within the above desired ranges by adjusting the solid content and the viscosity, molecular chains of the graphite sheet obtained from the polyimide film are further elongated. Thus a heat transfer rate thereof may be increased due to an increase in the length of a carbon-based heat transfer medium and excellent thermal conductivity may be obtained. Furthermore, instability in the film preparation process may be controlled.

The weight-average molecular weight of the polyamic acid solution may be represented by Equation 1 below, which has the solid content ($\beta_1$) and the viscosity ($\beta_2$) as variables.

Specifically, in the following preparation examples, polyamic solutions having a solid content of 15%, 16%, 17%, and 18.5% were used to prepare three kinds of polymerization solutions which had low/medium/high viscosity for each solid content, and the weight-average molecular weight of each solution was measured (see Table 3). In order to examine the relationship of the weight-average molecular weight with the viscosity and the solid content, multiple regression analysis was performed by taking the common logarithms of each measured value and using a statistical program (Excel). An equation thus obtained is as the following Equation 2.

$$\text{Log}_{10}(\text{weight-average molecular weight})=6.25-1.46 \text{ log}_{10}(\beta_1)+0.18 \text{ log}_{10}(\beta_2) \quad \text{[Equation 2]}$$

Further, as described above, the weight-average molecular weight of the polyamic acid solution should be 240,000 or more in order to provide excellent thermal conductivity of the graphite sheet. By applying this correlation to Equation 2 the following Equation 1 relating to the relationship between the weight-average molecular weight with the viscosity and the solid content may be obtained.

$$-0.87 \le -1.46 \text{ log}_{10}(\beta_1)+0.18 \text{ log}_{10}(\beta_2) \quad \text{[Equation 1]}$$

When the solid content denotes the weight percentage of the monomers based on the total weight of the solvent and the monomers used in the polymerization of the polyamic acid, the solid content may be in a range of 12% to 23%, particularly 12% to 20%, and more particularly 15% to 20%.

Furthermore, the viscosity may be in a range of 10,000 cps to 1,700,000 cps, particularly 10,000 cps to 900,000 cps, or more particularly 55,000 cps to 900,000 cps at 23° C.

The method of preparing a polyimide film for preparing a graphite sheet according to the present invention includes the mixing of the polyamic acid solution with an imidization solution to prepare a gel film.

First, an imidized resin is prepared by uniformly mixing the polyamic acid solution with the imidization solution. Any material may be used as the imidization solution as long as it is typically used for chemical cure. The imidization solution, for example, may be selected from the group consisting of a dehydrating agent, a catalyst (hardener), a filler (inorganic particles), a polar organic solvent, and a mixture thereof, and may particularly be a mixed solution of a dehydrating agent, a catalyst, a filler, and a polar organic solvent. More particularly, the imidization solution may be a mixed solution comprising a dehydrating agent such as acetic anhydride; a catalyst (hardener) such as tertiary amines selected from the group consisting of pyridine, beta-picoline, isoquinoline, and a mixture thereof; a filler (inorganic particles) such as silicon, silicon dioxide, silicon nitride, aluminum, alumina, titanium, titanium oxide, phosphorus, calcium phosphate, calcium hydrogen phosphate (dicalcium phosphate), calcium, potassium, or a mixture thereof; and a polar organic solvent selected from the group consisting of N-methylpyrrolidone, dimethylformamide, methylacetamide, and a mixture thereof.

Components of the imidization solution may be appropriately selected and used in typical amounts. Particularly, since the filler plays an important role in the improvement of windability of the film by preventing a blocking phenomenon occurred during the preparation of the film, the filler may be included in an amount of 500 ppm to 5,000 ppm, particularly 1,000 ppm to 3,000 ppm, based on a total weight of the polyimide film.

The imidization solution may be included in an amount of 20 parts by weight to 60 parts by weight, particularly 35 parts by weight to 50 parts by weight, based on 100 parts by weight of the polyamic acid, and the amount of the imidization solution may vary according to the thickness of the polyimide film prepared.

The imidization solution may be coated on a support (e.g., stainless steel plate, glass plate, aluminum foil, endless stainless steel belt, stainless drum, etc.), primarily heat-treated, and dried to prepare a partially chemically imidized gel film.

The primary heat treatment process for partial chemical imidization may be performed at a temperature of 100° C. to 200° C. for 5 minutes to 15 minutes.

The method of preparing a polyimide film for preparing a graphite sheet according to the present invention includes the imidization of the gel film by performing a heat treatment.

For complete imidization of the partially chemically imidized gel film, the gel film may be separated from the support and secondarily heat-treated. The secondary heat treatment process for the complete imidization may be performed at a temperature of 250° C. to 850° C. for 5 minutes to 25 minutes. In the secondary heat treatment process, the heat treatment may be performed under constant tensile strength to remove residual stress in the film generated in the film preparation process.

A graphite sheet may be prepared from the polyimide film produced by the above preparation method through a carbonization process typically used.

Specifically, the polyimide film is disposed between graphite plates and carbonized for 1 hour to 5 hours in a reactor at a temperature of 500° C. to 1,000° C., and a film-shaped graphite sheet may then be prepared by increasing the temperature of the reactor to 2,000° C. to 3,000° C. and carbonizing for 5 hours to 10 hours.

In the method of preparing a polyimide film for preparing a graphite sheet according to the present invention, a polyamic acid solution having a high weight-average molecular weight may be obtained by controlling the viscosity and the solid content of the polyamic acid solution and thus, a desired polyimide film may be prepared therefrom. Further, since the length of the carbon chains rearranged during graphitization is increased, the polyimide film may be converted into a graphite sheet having excellent thermal conductivity. Also, since the polyimide film has improved windability by further including inorganic particles as a filler, it may facilitate the wind operation.

Mode for the Invention

Hereinafter, the present invention is explained in detail by Examples. The following Examples are intended to further illustrate the present invention without limiting its scope.

PREPARATION EXAMPLES

Preparation Example 1: Preparation of Low Viscosity Polyamic Acid Solution with Solid Content of 15%

400 g of dimethylformamide was put in a 5 L reactor and the temperature was set to 20° C. Then, after 33.79 g of 4,4-diaminodiphenyl ether was added thereto and dissolved, 35.33 g of pyromellitic dianhydride was further added thereto and dissolved. When the dissolution was completed, viscosity was measured while gradually adding pyromellitic dianhydride to the above solution, and thus, low viscosity varnish having a viscosity of 30,000 cps to 150,000 cps (23° C.) was obtained. When the reaction was completed, the temperature of the reactor was set to 40° C., and a low viscosity polyamic acid solution was then obtained by performing polymerization for 2 hours.

Preparation Example 2: Preparation of Medium Viscosity Polyamic Acid Solution with Solid Content of 15%

A medium viscosity polyamic acid solution was obtained in the same manner as in Preparation Example 1 except that medium viscosity varnish having a viscosity of 250,000 cps to 300,000 cps was obtained.

Preparation Example 3: Preparation of High Viscosity Polyamic Acid Solution with Solid Content of 15%

A high viscosity polyamic acid solution was obtained in the same manner as in Preparation Example 1 except that high viscosity varnish having a viscosity of 400,000 cps was obtained.

Preparation Example 4: Preparation of Low Viscosity Polyamic Acid Solution with Solid Content of 16%

300 g of dimethylformamide was put in a 0.5 L reactor and the temperature was set to 20° C. Then, after 27.35 g of 4,4-diaminodiphenyl ether was added thereto and dissolved, 28.6 g of pyromellitic dianhydride was further added thereto and dissolved. When the dissolution was completed, viscosity was measured while gradually adding pyromellitic dianhydride to the above solution, and thus, low viscosity varnish having a viscosity of 30,000 cps to 150,000 cps (23° C.) was obtained. When the reaction was completed, the temperature of the reactor was set to 40° C., and a low viscosity polyamic acid solution was then obtained by performing polymerization for 2 hours.

Preparation Example 5: Preparation of Medium Viscosity Polyamic Acid Solution with Solid Content of 16%

A medium viscosity polyamic acid solution was obtained in the same manner as in Preparation Example 4 except that medium viscosity varnish having a viscosity of 250,000 cps to 300,000 cps was obtained.

Preparation Example 6: Preparation of High Viscosity Polyamic Acid Solution with Solid Content of 16%

A high viscosity polyamic acid solution was obtained in the same manner as in Preparation Example 4 except that high viscosity varnish having a viscosity of 400,000 cps was obtained.

Preparation Example 7: Preparation of Low Viscosity Polyamic Acid

Solution with Solid Content of 17%

300 g of dimethylformamide was put in a 0.5 L reactor and the temperature was set to 20° C. Then, after 29.41 g of 4,4-diaminodiphenyl ether was added thereto and dissolved, 30.75 g of pyromellitic dianhydride was further added thereto and dissolved. When the dissolution was completed, viscosity was measured while gradually adding pyromellitic dianhydride to the above solution, and thus, low viscosity varnish having a viscosity of 30,000 cps to 150,000 cps (23° C.) was obtained. When the reaction was completed, the temperature of the reactor was set to 40° C., and a polyamic acid solution was then obtained by performing polymerization for 2 hours.

Preparation Example 8: Preparation of Medium Viscosity Polyamic Acid Solution with Solid Content of 17%

A medium viscosity polyamic acid solution was obtained in the same manner as in Preparation Example 7 except that medium viscosity varnish having a viscosity of 250,000 cps to 300,000 cps was obtained.

Preparation Example 9: Preparation of High Viscosity Polyamic Acid Solution with Solid Content of 17%

A high viscosity polyamic acid solution was obtained in the same manner as in Preparation Example 7 except that high viscosity varnish having a viscosity of 400,000 cps was obtained.

Preparation Example 10: Preparation of Low Viscosity Polyamic Acid Solution with Solid Content of 18.5%

300 g of dimethylformamide was put in a 0.5 L reactor and the temperature was set to 20° C. Then, after 32.59 g of 4,4-diaminodiphenyl ether was added thereto and dissolved, 34.08 g of pyromellitic dianhydride was further added thereto and dissolved. When the dissolution was completed, viscosity was measured while gradually adding pyromellitic dianhydride to the above solution, and thus, low viscosity varnish having a viscosity of 30,000 cps to 150,000 cps (23° C.) was obtained. When the reaction was completed, the temperature of the reactor was set to 40° C., and a polyamic acid solution was then obtained by performing polymerization for 2 hours.

Preparation Example 11: Preparation of Medium Viscosity Polyamic Acid Solution with Solid Content of 18.5%

A medium viscosity polyamic acid solution was obtained in the same manner as in Preparation Example 10 except that medium viscosity varnish having a viscosity of 250,000 cps to 300,000 cps was obtained.

Preparation Example 12: Preparation of High Viscosity Polyamic Acid Solution with Solid Content of 18.5%

A high viscosity polyamic acid solution was obtained in the same manner as in Preparation Example 10 except that high viscosity varnish having a viscosity of 400,000 cps was obtained.

Preparation Example 13: Preparation of Imidization Solution without the Addition of Filler (Inorganic Particles)

4.5 g of beta-picoline (boiling point 144° C.) as a catalyst for curing imide, 17.0 g of acetic anhydride as a dehydrating agent, and 23.5 g of dimethylformamide as a polar organic solvent were mixed and stirred to obtain 45 g of an imidization solution.

Preparation Example 14: Preparation of Imidization Solution with the Addition of Filler (Inorganic Particles)

45.03 g of an imidization solution was obtained in the same manner as in Preparation Example 13 except that 0.03 g of dicalcium phosphate ($CaHPO_4$) (2,000 ppm, Top flow-K, Ajinomoto Co., Inc.) was further added.

Preparation Example 15: Preparation of Imidization Solution with the Addition of Filler (Inorganic Particles)

45.09 g of an imidization solution was obtained in the same manner as in Preparation Example 13 except that 0.09 g of dicalcium phosphate ($CaHPO_4$) (6,000 ppm, Top flow-K, Ajinomoto Co., Inc.) was further added.

EXAMPLES

Preparation of Polyimide Film

Example 1

45 g of the imidization solution obtained in Preparation Example 13 was mixed with 100 g of the polyamic acid solution obtained in Preparation Example 1 and a stainless steel plate was coated with the mixed solution and dried with hot air for 4 minutes in a 120° C. oven. Then, a film was detached from the stainless steel plate and fixed with a frame pin. The frame having the film fixed thereto was heat-treated at 450° C. for 7 minutes and the film was then detached to obtain a polyimide film having an average thickness of 50 μm.

Examples 2 to 9

Polyimide films having an average thickness of 50 μm were obtained in the same manner as in Example 1 except that the polyamic acid solutions prepared in Preparation Examples 2 and 3; Preparation Examples 5 and 6; Preparation Examples 8 and 9; and Preparation Examples 11 and 12 were used instead of the polyamic acid solution obtained in Preparation Example 1.

Examples 10 and 11

Polyimide films having an average thickness of 50 μm were obtained in the same manner as in Example 1 except that the imidization solutions obtained in Preparation Examples 14 and 15, respectively, were used instead of the imidization solution obtained in Preparation Example 13.

COMPARATIVE EXAMPLES

Comparative Examples 1 to 3: Preparation of Polyimide Films

Polyimide films having an average thickness of 50 μm were obtained in the same manner as in Example 1 except that the polyamic acid solutions obtained in Preparation Examples 4, 7, and 10, respectively, were used instead of the polyamic acid solution obtained in Preparation Example 1.

EXPERIMENTAL EXAMPLES

Hereinafter, in Experimental Examples 1 and 2, the following experiments were performed with regard to the polyamic acid solutions prepared in the preparation examples.

Experimental Example 1: Measurement of Viscosity of Polyamic Acid Solution

Viscosity of each polyamic acid solution prepared in the preparation examples was measured under the following conditions by using viscosity measurement equipment (Model: Rheostress 600, Haake).
Shear rate: 1/s, temperature: 23° C., plate gap: 1 mm

Experimental Example 2: Measurement of Weight-Average Molecular Weight of Polyamic Acid Solution The weight-average molecular weight of each polyamic acid solution prepared in the Preparation Examples was measured under the conditions as described in Table 1 by using a molecular weight measurement apparatus (Model: Sykam GPC SYSTEM, Laserchrome).

cance for the analysis was indicated by signif.codes (0 '*'/0.001 ''/0.01 '*'/0.05 '.'/0.1 ' '/1).

TABLE 1

| Column | Waters styragel HR 5E + 4E |
|---|---|
| Eluent | Dimethylformamide/tetrahydrofuran = 1/1 (include 30 mM LiBr + 30 mM $H_3PO_4$) |
| Temperature | 40° C. |
| Movement speed | 0.8 ml/min (1.5 MPa) |
| Injection capacity | 100 μl |
| Concentration | 10 mg/ml |
| Polystyrene standard (molecular weight) | 13, 900/30, 200/55, 100/197K/1, 370K |

TABLE 2

| Category | Coefficient | Standard error | t-statistic | P value |
|---|---|---|---|---|
| Y-intercept | 6.2481 | 0.1472 | 42.4500 | 1.1146E−11*** |
| $Log_{10}$(solid content) | −1.4556 | 0.1196 | −12.1708 | 6.8261E−07*** |
| $Log_{10}$(viscosity) | 0.1844 | 0.0103 | 17.8358 | 2.4869E−08*** |
| F ratio | | | 203.056*** | |

Note:
signif. codes (0 '*'/0.001 ''/0.01 '*'/0.05 '.'/0.1 ' '/1)

TABLE 3

| | | Preparation Example | | | | | |
|---|---|---|---|---|---|---|---|
| Polyamic acid solution | | 1 | 2 | 3 | 4 | 5 | 6 |
| Measured value | Solid content ($\beta_1$, %) | 15 | 15 | 15 | 16 | 16 | 16 |
| | Viscosity ($\beta_2$, cps) | 63,850 | 289,700 | 440,600 | 46,000 | 168,200 | 429,000 |
| | Weight-average molecular weight | 254,299 | 346,272 | 381,264 | 235,305 | 283,851 | 335,009 |
| Transform of measured value using common logarithms | Solid content ($\beta_1$, %) | 1.176 | 1.176 | 1.176 | 1.204 | 1.204 | 1.204 |
| | Viscosity ($\beta_2$, cps) | 4.805 | 5.462 | 5.644 | 4.633 | 5.226 | 5.632 |
| | Weight-average molecular weight | 5.405 | 5.539 | 5.581 | 5.372 | 5.453 | 5.525 |

| | | Preparation Example | | | | | |
|---|---|---|---|---|---|---|---|
| Polyamic acid solution | | 7 | 8 | 9 | 10 | 11 | 12 |
| Measured value | Solid content ($\beta_1$, %) | 17 | 17 | 17 | 18.5 | 18.5 | 18.5 |
| | Viscosity ($\beta_2$, cps) | 110,200 | 286,000 | 453,000 | 76,000 | 294,000 | 464,000 |
| | Weight-average molecular weight | 239,785 | 299,009 | 317,678 | 199,466 | 245,308 | 296,584 |
| Transform of measured value using common logarithms | Solid content ($\beta_1$, %) | 1.230 | 1.230 | 1.230 | 1.267 | 1.267 | 1.267 |
| | Viscosity ($\beta_2$, cps) | 5.042 | 5.456 | 5.656 | 4.881 | 5.468 | 5.667 |
| | Weight-average molecular weight | 5.380 | 5.476 | 5.502 | 5.300 | 5.390 | 5.472 |

Figure 2:
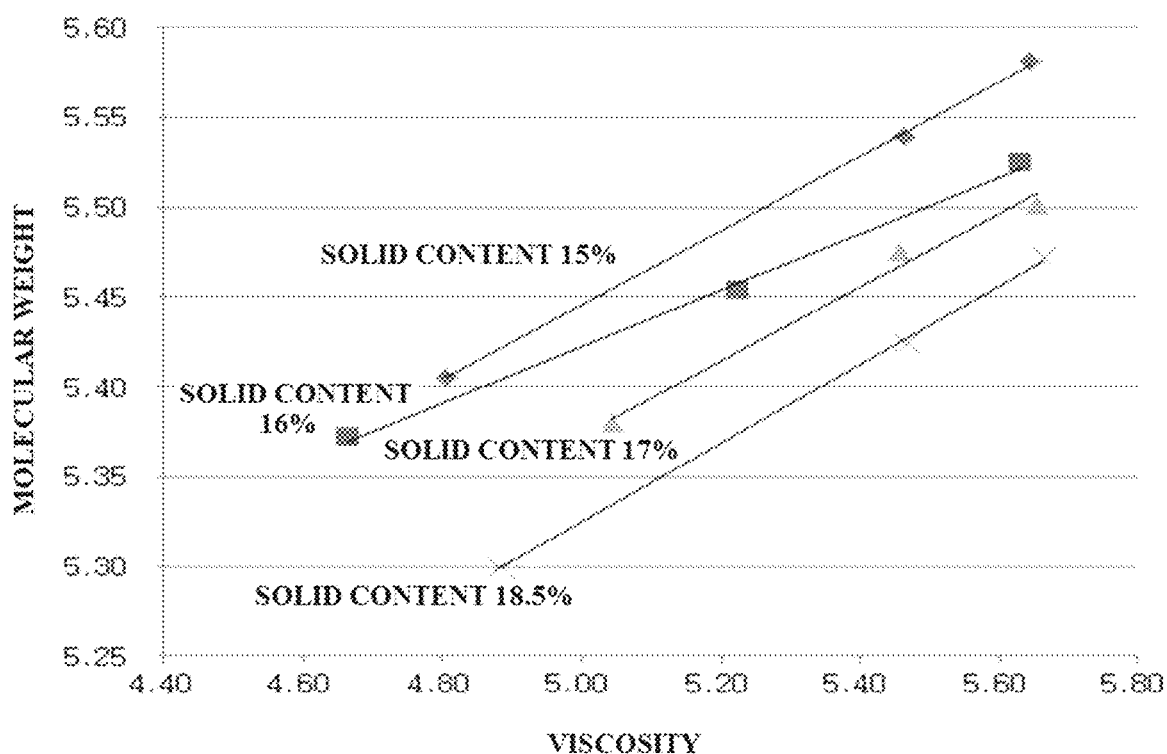
FIG. 2 is a graph obtained by multiple regression analysis in which the measurement values of FIG. 1 are transformed by using common logarithms.

The measured viscosity and weight-average molecular weight for respective solid content are presented in Table 3 and FIG. 1. Furthermore, the measured values were transformed using common logarithms and the results thereof are presented in the following Table 3 and FIG. 2. Also, Table 2 shows the result of multiple regression analysis performed using a statistical program (Excel) and the level of signifi- From the results of Table 3, since most of the polyamic acid solutions, except certain low viscosity polyamic acid solutions, had an average molecular weight of 240,000 or more, it is understood that the polyamic acid solutions having a molecular weight intended in the present invention were prepared.

In Experimental Example 3, the following experiments were performed with regard to the graphite sheets prepared in Examples and Comparative Examples. A size of each sample of Examples 10 to 18 and Comparative Examples 4 to 6 was the same as listed in Table 4.

Experimental Example 3: Measurement of Thermal Diffusivity and Thermal Conductivity of Graphite Sheet The polyimide films obtained in Examples and Comparative Examples were disposed between graphite plates, and the temperature was increased to 900° C. at a rate of 1° C./min using a high temperature carbonization furnace under nitrogen gas and was maintained for 2 hours (carbonization). Subsequently, the temperature was increased to 2,600° C. at a rate of 20° C./min using an ultra-high temperature furnace under argon gas and was maintained for 8 hours, and then, cooling was performed to obtain graphite sheets.

The thermal diffusivity of the graphite sheets were measured by a laser flash method using a thermal diffusivity measurement apparatus (Model: LFA 447, Netzsch), and the thermal conductivity were calculated by multiplying the measured thermal diffusivity values by density (weight/volume) and specific heat (theoretical value: 0.7 kJ/(kg·K)). The results thereof are presented in Tables 4 and 5. Table 4 shows the evaluation results of the graphite sheets prepared by using the polyimide films without a filler (inorganic particles), and Table 5 shows the evaluation results of the graphite sheets prepared by using the polyimide films including a filler (inorganic particles).

TABLE 4

| | | | Example 1 | Example 2 | Example 3 | Example 4 | Example 5 | Example 6 |
|---|---|---|---|---|---|---|---|---|
| Polyamic acid solution | | | Preparation Example 1 | Preparation Example 2 | Preparation Example 3 | Preparation Example 5 | Preparation Example 6 | Preparation Example 8 |
| Imidization solution | | | | | Preparation Example 13 | | | |
| Carbonization evaluation conditions and results | Sample size | Diameter (mm) | 23 | 23 | 23 | 23 | 23 | 23 |
| | | Thickness (mm) | 0.037 | 0.037 | 0.037 | 0.037 | 0.037 | 0.037 |
| | | Weight (g) | 0.0172 | 0.0173 | 0.0177 | 0.0174 | 0.0173 | 0.0173 |
| | | Density (g/m$^3$) | 1.1194 | 1.1259 | 1.1520 | 1.1325 | 1.1259 | 1.1259 |
| | Evaluation results | Thermal diffusivity (m$^2$/s) | 521 | 590 | 592 | 532 | 576 | 548 |
| | | Specific heat (kJ/g · K) | 0.7 | 0.7 | 0.7 | 0.7 | 0.7 | 0.7 |
| | | Thermal conductivity (W/(m · K)) | 408.3 | 465.0 | 477.4 | 421.7 | 454.0 | 431.9 |

| | | | Example 7 | Example 8 | Example 9 | Comparative Example 1 | Comparative Example 2 | Comparative Example 3 |
|---|---|---|---|---|---|---|---|---|
| Polyamic acid solution | | | Preparation Example 9 | Preparation Example 11 | Preparation Example 12 | Preparation Example 4 | Preparation Example 7 | Preparation Example 10 |
| Imidization solution | | | | | Preparation Example 13 | | | |
| Carbonization evaluation conditions and results | Sample size | Diameter (mm) | 23 | 23 | 23 | 23 | 23 | 23 |
| | | Thickness (mm) | 0.037 | 0.037 | 0.037 | 0.037 | 0.037 | 0.037 |
| | | Weight (g) | 0.0174 | 0.0172 | 0.0175 | 0.0173 | 0.0173 | 0.0175 |
| | | Density (g/m$^3$) | 1.1325 | 1.1194 | 1.1390 | 1.1259 | 1.1259 | 1.1390 |
| | Evaluation results | Thermal diffusivity (m$^2$/s) | 561 | 513 | 532 | 505 | 503 | 465 |
| | | Specific heat (kJ/g · K) | 0.7 | 0.7 | 0.7 | 0.7 | 0.7 | 0.7 |
| | | Thermal conductivity (W/(m · K)) | 444.7 | 402.0 | 424.2 | 398.0 | 396.4 | 370.7 |

From the results of Table 4, the thermal diffusivity and the thermal conductivity of the graphite sheets, which were obtained from the polyimide films prepared in Examples, were higher than those of the comparative examples. Since the maximum values of the thermal diffusivity and thermal conductivity measured were 590 m$^2$/s and 477 W/(m·K), respectively, it may be understood that the thermal conductivity of the graphite sheets prepared by using the polyimide films of Examples was significantly better.

TABLE 5

|  |  |  | Example 1 | Example 10 | Example 11 |
|---|---|---|---|---|---|
| Polyamic acid solution |  |  | Preparation Example 1 | Preparation Example 1 | Preparation Example 1 |
| Solid content ($\beta_1$) |  |  | 15 | 15 | 15 |
| Viscosity ($\beta_2$) |  |  | 63,850 | 63,850 | 63,850 |
| Weight-average molecular weight |  |  | 254,299 | 254,299 | 254,299 |
| Type of inorganic particles |  |  | — | Calcium phosphate (CaHPO$_4$) | Calcium phosphate (CaHPO$_4$) |
| Amount of inorganic particles added (g/ppm) |  |  | — | 0.03/2,000 | 0.09/6,000 |
| Imidization solution |  |  | Preparation Example 13 | Preparation Example 14 | Preparation Example 15 |
| Carbonization evaluation conditions and results | Sample after carbonization | Diameter (mm) | 23 | 23 | 23 |
|  |  | Thickness (mm) | 0.037 | 0.037 | 0.037 |
|  |  | Weight (g) | 0.0172 | 0.0172 | 0.0171 |
|  |  | Density (g/m$^3$) | 1.119 | 1.121 | 1.125 |
|  | Evaluation results | Thermal diffusivity (m$^2$/s) | 521 | 515 | 465 |
|  |  | Specific heat (kJ/g · K) | 0.7 | 0.7 | 0.7 |
|  |  | Thermal conductivity (W/(m · K)) | 408.3 | 404.1 | 366.2 |
| Film winding operability |  |  | x | ○ | ○ |

From the results of Table 5, in the case that the polyimide films prepared in Examples include an appropriate amount of the filler, it may be understood that the windability of the film is excellent due to prevention of the blocking phenomenon, and high thermal conductivity can be maintained.

The invention claimed is:

1. A method of preparing a polyimide film for graphite sheet, the method comprising:
    (a) preparing a polyamic acid solution by reaction of a diamine monomer with an acid dianhydride monomer in a solvent;
    (b) mixing the polyamic acid solution with an imidization solution to prepare a gel film; and
    (c) imidizing the gel film by performing a heat treatment, wherein, a solid content ($\beta$1) of the polyamic acid solution is in a range of 15% to 20% where the solid content ($\beta$1) of the polyamic acid solution denotes a weight percentage of the monomers based on a total weight of the solvent and the monomers used in the reaction; the polyamic acid solution has a viscosity ($\beta$2) of 55,000 cps to 900,000 cps at 23° C.; and the solid content ($\beta$1) and viscosity ($\beta$2) of the polyamic acid solution satisfy Equation 1:

Equation 1
    $$-0.87 \leq -1.46 \log 10(\beta 1) + 0.18 \log 10(\beta 2)$$
    wherein the graphite sheet has a thermal conductivity of 402–477.4 W/(m·K), wherein the diamine monomer comprises one or more selected from the group consisting of para-phenylenediamine (pPDA), diaminophenyl ether, o-phenylenediamine, m-phenylenediamine, 4,4-diaminodiphenyl ether (ODA), 3,4-diaminodiphenyl ether, and 2,4-diaminodiphenyl ether, and wherein the acid dianhydride monomer comprises one or more selected from the group consisting of biphenyltetracarboxylic acid dianhydride or a derivative thereof, pyromellitic dianhydride (PMDA), 3,3',4,4'-benzophenone tetracarboxylic acid anhydride, and p-phenylene-bis trimellitic dianhydride.

2. The method of claim 1, wherein the imidization solution comprises a filler, and the filler comprises one or more inorganic particle selected from the group consisting of silicon, silicon dioxide, silicon nitride, aluminum, alumina, titanium, titanium oxide, phosphorus, calcium phosphate, calcium hydrogen phosphate (dicalcium phosphate), calcium, potassium, and a mixture thereof.

3. The method of claim 1, wherein the imidization solution comprises a filler, and the filler is included in an amount of 500 ppm to 5,000 ppm based on a total weight of the polyimide film.

* * * * *